(12) United States Patent
Vemula et al.

(10) Patent No.: US 11,537,414 B2
(45) Date of Patent: Dec. 27, 2022

(54) ARCHITECTURE MAPPING OF APPLICATIONS

(71) Applicant: Bank of America Corporation, Charlotte, NC (US)

(72) Inventors: Srikanth Vemula, Telangana (IN); Sasidhar Purushothaman, Telangana (IN); Austin J. Fernandez, Tega Cay, SC (US); Praveen Kumar Kondabathini, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 305 days.

(21) Appl. No.: 16/892,953

(22) Filed: Jun. 4, 2020

(65) Prior Publication Data
US 2021/0382725 A1 Dec. 9, 2021

(51) Int. Cl.
*G06F 9/448* (2018.01)
*G06F 9/455* (2018.01)
*G06N 20/00* (2019.01)
*G06F 8/77* (2018.01)
*G06F 11/34* (2006.01)

(52) U.S. Cl.
CPC ............ *G06F 9/4494* (2018.02); *G06F 8/77* (2013.01); *G06F 9/455* (2013.01); *G06F 11/3457* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,978,228 B1 | 12/2005 | Gordon | |
| 7,526,501 B2 * | 4/2009 | Albahari | G06F 16/252 707/999.102 |
| 8,397,210 B2 | 3/2013 | Dutta et al. | |
| 8,607,190 B2 | 12/2013 | Coldicott et al. | |
| 10,133,649 B2 | 11/2018 | Li et al. | |
| 2009/0182610 A1* | 7/2009 | Palanisamy | G06Q 10/06 707/600 |
| 2011/0099532 A1* | 4/2011 | Coldicott | G06F 8/36 717/106 |
| 2015/0309772 A1* | 10/2015 | Duggal | G06F 8/35 717/104 |

(Continued)

FOREIGN PATENT DOCUMENTS

WO 2007101487 A1 9/2007

*Primary Examiner* — Marina Lee
(74) *Attorney, Agent, or Firm* — Banner & Witcott, Ltd.

(57) ABSTRACT

An executable application's architecture may be mapped by executing the executable application, inputting a series of request data sets into the executable application, receiving one or more responses from the executable application, and performing an evaluation based on the responses. One or more indications of an architectural component may be extracted from metadata associated with the one or more received responses and associated with a corresponding request data set of the series of request data sets. The one or more indications of an architectural component may be associated with processing by the executable application of the corresponding request data set of the series of request data sets. An architecture of the executable application may be determined based on the one or more indications of an architectural component.

24 Claims, 4 Drawing Sheets

(56) References Cited

U.S. PATENT DOCUMENTS

2016/0132327 A1* 5/2016 Tehrani ................... G06F 8/20
    717/105
2017/0329692 A1* 11/2017 Li ............................ G06F 8/75

* cited by examiner

ARCHITECTURE MAPPING OF APPLICATIONS

FIELD

Aspects described herein generally relate to computer systems and networks. More specifically, aspects of this disclosure relate to architecture mapping of applications based on transaction traversing.

BACKGROUND

Client-server computing systems and enterprise applications are typically designed and developed according to a specified architecture. The architecture is typically documented, for example, in a diagram illustrating logical interconnections between multiple modules, as well as process flow and/or data flow between the multiple modules.

SUMMARY

Aspects of the disclosure provide solutions that address and overcome technical problems associated with determining an architecture of an existing application. The architecture may comprise application components (e.g., logic, functions, etc.), infrastructure components (e.g., computing and/or network services), and/or interconnections. As an application evolves over time, the design and/or architecture of the application may be modified, for example, repeatedly and/or on an ongoing basis. Over time, the present architecture of the application may become inconsistent with documentation of the architecture made before the modifications were made. The present architecture of the modified application may become unknown, for example, if the modifications at the architectural level are undocumented or insufficiently documented.

In accordance with one or more arrangements, a computing platform having at least one processor, a communication interface, and memory may perform architecture mapping by monitoring and evaluating performance of an existing application to determine the application's architecture. A runtime executable program associated with the application may be monitored during execution by a probe executable module. The probe executable module may generate a log of activities performed by the runtime executable program, data accessed by and/or input into the runtime executable program, data generated by and/or output by the runtime executable program, computer system resources and/or modules accessed by the runtime executable program, and/or other programs called by the runtime executable program. A rendering module may analyze the log of activities and generate a graph, e.g., a directed graph, representing process and/or data flow during operation of the runtime executable program as an interconnected set of modules. A simulation module may, based on the log of activities, simulate data traversals through the graph, and output a simulation results log representing the simulated process and/or data flow. A results analysis module may analyze the simulation results log to determine one or more candidate architectures for the simulated application. The results analysis module may analyze the simulation results log in combination with the log of activities of the monitored application to determine iterative modifications to make to the graph used by the simulation module. An iterative simulation, results analysis, and graph rendering process may be performed until a simulation results output and/or performance measurement matches a predetermined result and/or meets a predetermined condition. The iterative process may comprise a machine learning process to progress toward a final determined application architecture. Once the match with the predetermined result and/or meeting of the predetermined condition is verified, the final determined application architecture may be rendered and output. The final determined application architecture may be compared against a prior documented architecture for the application, for example, to determine deviations and/or changes in the architecture. The final determined application architecture may be analyzed in view of architecture design rules to determine any rules that may be violated by the present application architecture.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrations, reference is made to the accompanying drawings, which form a part hereof, and in which is shown, by way of illustration, various examples in which aspects of the disclosure may be practiced. It is to be understood that other examples may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Various aspects of this disclosure relate to devices, systems, and methods for architecture mapping of applications. An application mapping engine may determine an architecture of an existing executable application by monitoring and analyzing process flow and data flow of the application during runtime execution, determining candidate architecture graphs based on the monitored process flow and data flow, performing simulations of the candidate architectures, and iteratively revising the candidate architecture graphs and performing simulations of the revised candidate architecture graphs. The process flow and data flow of a plurality of features of the executable application may be monitored. The determination of the final architecture of the executable application may be based, at least in part, on an analysis of changes in the candidate architectures through the iterative process. Scripts, templates, and options may be preconfigured for determining the candidate architecture graphs, and the iteration process may include modifications of the scripts, templates, and options based on analysis of simulation results of the candidate architecture graphs. The iteration process may include performing machine learning based on the monitored process flow and data flow of the application, the candidate architecture graphs, and/or the analysis of the results of simulating the candidate architecture graphs.

Figure 1A:
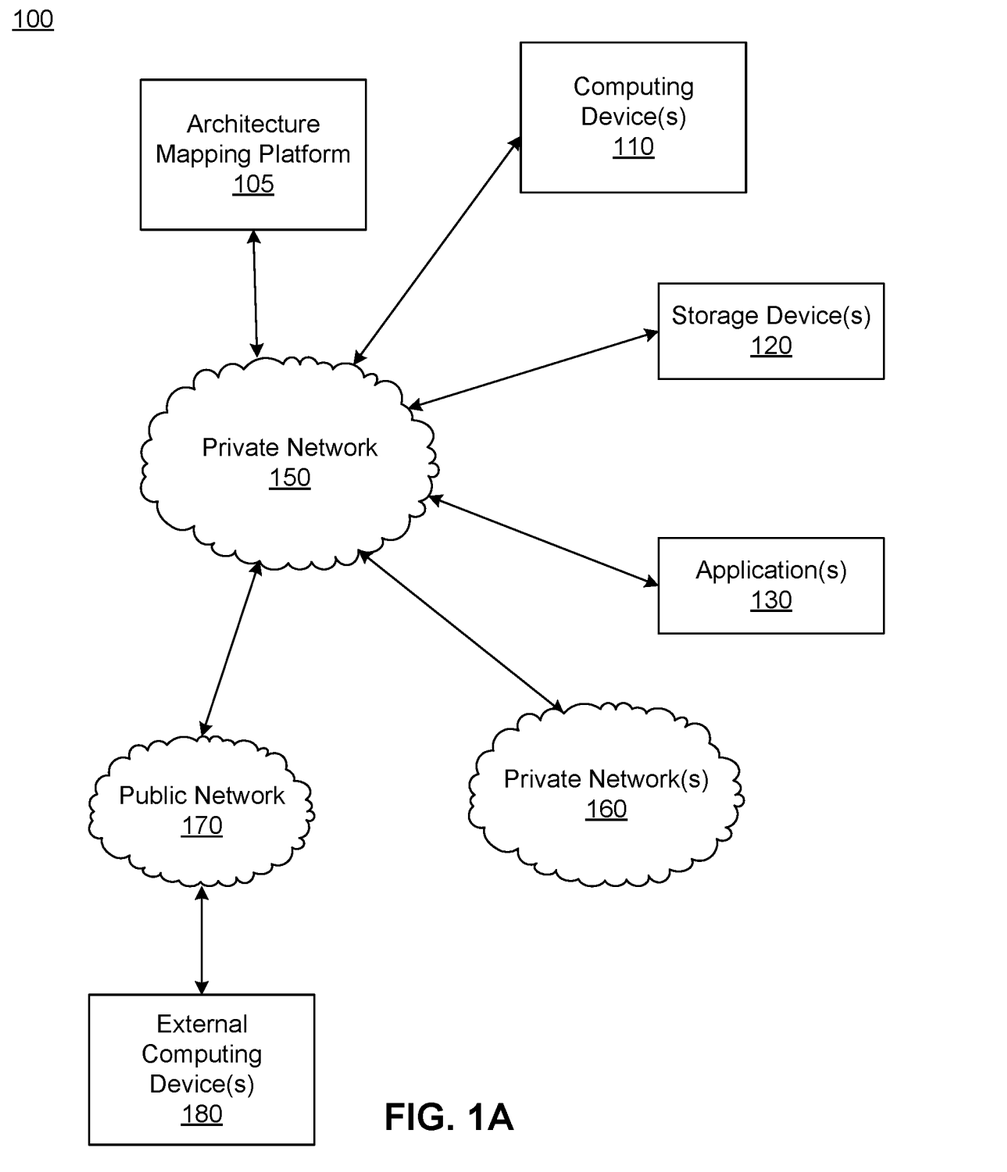
FIGS. 1A and 1B depict an illustrative computing environment for architecture mapping of applications based on transaction traversing, in accordance with one or more example arrangements.
Figure 1B:
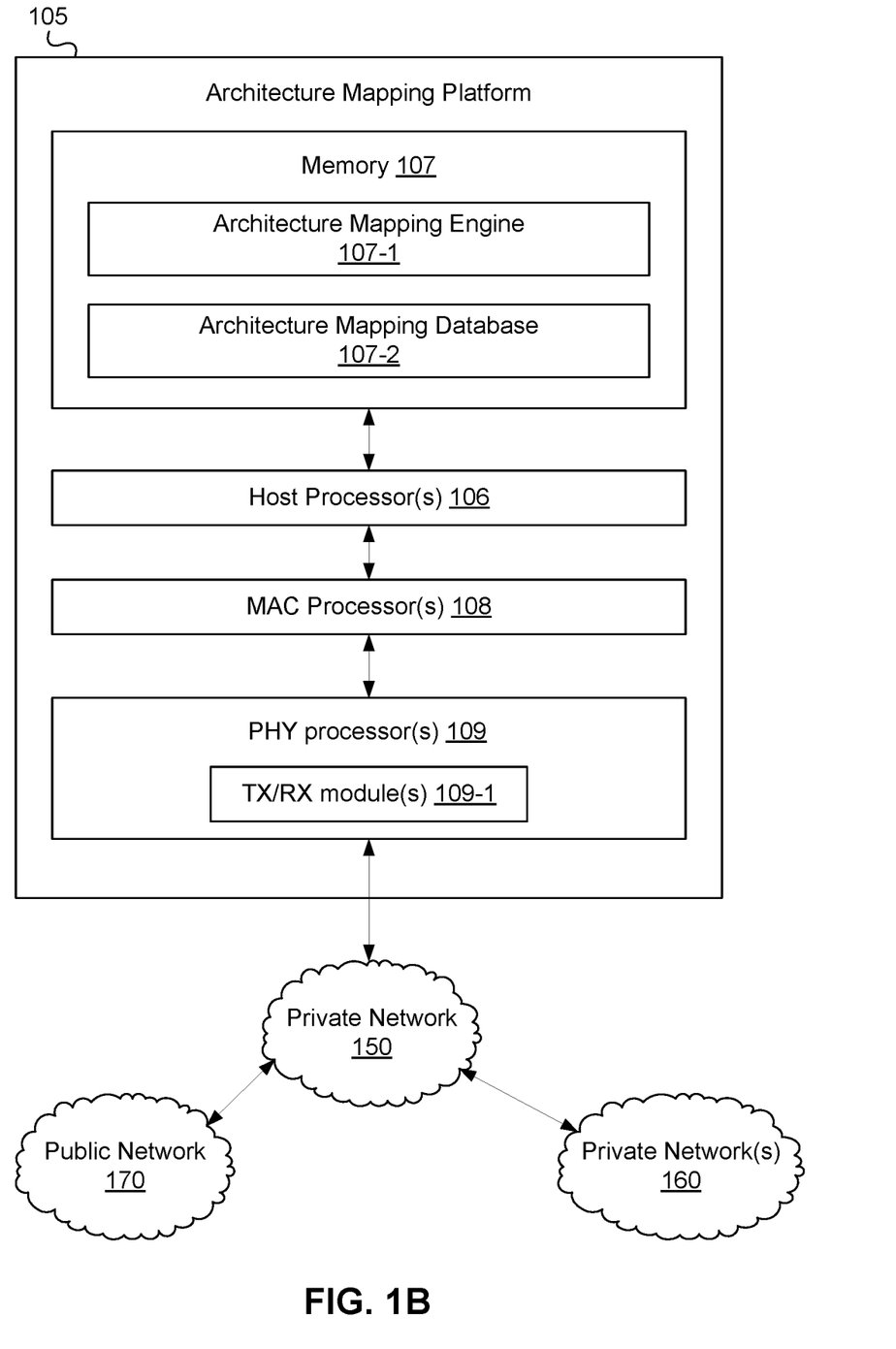

FIGS. 1A and 1B depict an illustrative computing environment for architecture mapping of executable applications, in accordance with one or more example arrangements. Referring to FIG. 1A, a computing environment 100 may comprise one or more devices (e.g., computer systems, communication devices, servers). The computing environment 100 may comprise, for example, an architecture mapping platform 105, computing device(s) 110, and storage device(s) 120 linked over a private network 150. The storage device(s) 120 may comprise a database, for example, a relational database (e.g., Relational Database Management System (RDBMS), Structured Query Language (SQL), etc.). Application(s) 130 may operate on one or more computing devices or servers associated with the private network 150. The private network 150 may comprise an enterprise private network, for example.

The computing environment 100 may comprise one or more networks (e.g., public networks and/or private networks), which may interconnect one or more of the architecture mapping platform 105, the computing device(s) 110, the storage device(s) 120, and/or one or more other devices and servers. One or more applications 130 may operate on one or more devices in the computing environment. The networks may use wired and/or wireless communication protocols. The private network 150 may be associated with, for example, an enterprise organization. The private network 150 may interconnect the architecture mapping platform 105, the computing device(s) 110, the storage device(s) 120, and/or one or more other devices/servers which may be associated with the enterprise organization. The private network 150 may be linked to other private network(s) 160 and/or a public network 170. The public network 170 may comprise the Internet and/or a cloud network. The private network 150 and the private network(s) 160 may correspond to, for example, a local area network (LAN), a wide area network (WAN), a peer-to-peer network, or the like.

A user in a context of the computing environment 100 may be, for example, an associated user (e.g., an employee, an affiliate, or the like) of the enterprise organization. An external user (e.g., a client) may utilize services being provided by the enterprise organization, and access one or more resources located within the private network 150 (e.g., via the public network 170). Users may operate one or more devices in the computing environment 100 to send messages to and/or receive messages from one or more other devices connected to the computing environment 100. An enterprise organization may correspond to any government or private institution, an educational institution, a financial institution, retailer, or the like.

As illustrated in greater detail below, the architecture mapping platform 105 may comprise one or more computing devices configured to perform one or more of the functions described herein. The architecture mapping platform 105 may comprise, for example, one or more computers (e.g., laptop computers, desktop computers, servers, server blades, or the like).

The computing device(s) 110 may comprise one or more of an enterprise application host platform, an enterprise user computing device, an administrator computing device, and/or other computing devices, platforms, and servers associated with the private network 150. The enterprise application host platform(s) may comprise one or more computing devices and/or other computer components (e.g., processors, memories, communication interfaces). The enterprise application host platform may be configured to host, execute, and/or otherwise provide one or more enterprise applications. The enterprise application host platform(s) may be configured, for example, to host, execute, and/or otherwise provide one or more transaction processing programs, user servicing programs, and/or other programs associated with an enterprise organization. The enterprise application host platform(s) may be configured to provide various enterprise and/or back-office computing functions for an enterprise organization. The enterprise application host platform(s) may comprise various servers and/or databases that store and/or otherwise maintain account information, such as financial/membership account information including account balances, transaction history, account owner information, and/or other information corresponding to one or more users (e.g., external users). The enterprise application host platform(s) may process and/or otherwise execute transactions on specific accounts based on commands and/or other information received from other computer systems comprising the computing environment 100. The enterprise application host platform(s) may receive data from the architecture mapping platform 105, manipulate and/or otherwise process such data, and/or return processed data and/or other data to the architecture mapping platform 105 and/or to other computer systems in the computing environment 100.

The enterprise user computing device may comprise a personal computing device (e.g., desktop computer, laptop computer) or mobile computing device (e.g., smartphone, tablet). The enterprise user computing device may be linked to and/or operated by a specific enterprise user (e.g., an employee or other affiliate of an enterprise organization).

The administrator computing device may comprise a personal computing device (e.g., desktop computer, laptop computer) or mobile computing device (e.g., smartphone, tablet). The administrator computing device may be linked to and/or operated by an administrative user (e.g., a network administrator of an enterprise organization). The administrator computing device may receive data from the architecture mapping platform 105, manipulate and/or otherwise process such data, and/or return processed data and/or other data to the architecture mapping platform 105 and/or to other computer systems in the computing environment 100. The administrator computing device may be configured to control operation of the architecture mapping platform 105.

The application(s) 130 may comprise transaction processing programs, user servicing programs, and/or other programs associated with an enterprise organization. The application(s) 130 may correspond to applications that provide various enterprise and/or back-office computing functions for an enterprise organization. The application(s) 130 may correspond to applications that facilitate storage, modification, and/or maintenance of account information, such as financial/membership account information including account balances, transaction history, account owner information, and/or other information corresponding to one or more users (e.g., external users). The application(s) 130 may process and/or otherwise execute transactions on specific accounts based on commands and/or other information received from other computer systems comprising the computing environment 100. The application(s) 130 may operate in a distributed manner across multiple computing devices (e.g., the computing device(s) 110) and/or servers, operate on a single computing device and/or server. The application(s) 130 may be used for execution of various operations corresponding to the one or more computing devices (e.g., the computing device(s) 110) and/or servers.

The storage device(s) 120 may comprise various memory devices such as hard disk drives, solid state drives, magnetic tape drives, or other electronically readable memory, and/or the like. The storage device(s) 120 may be used to store data corresponding to operation of one or more applications within the private network 150 (e.g., the application(s) 130), and/or computing devices (e.g., the computing device(s) 110). The storage device(s) 120 may receive data from the architecture mapping platform 105, store the data, and/or transmit the data to the architecture mapping platform 105 and/or to other computing systems in the computing environment 100.

An architecture of the private network(s) 160 may be similar to an architecture of the private network 150. The private network(s) 160 may correspond to, for example, another enterprise organization that communicates data with the private network 150. The private network 150 may also be linked to the public network 170. The public network 170 may comprise the external computing device(s) 180. The external computer device(s) 180 may include at least one computing device (e.g., desktop computer, laptop computer) or mobile computing device (e.g., smartphone, tablet). The external computer device(s) 180 may be linked to and/or operated by a user (e.g., a client, an affiliate, or an employee) of an enterprise organization associated with the private network 150. The user may interact with one or more enterprise resources while using the external computing device(s) 180 located outside of an enterprise firewall.

The architecture mapping platform 105, the computing device(s) 110, the external computing device(s) 180, and/or one or more other systems/devices in the computing environment 100 may comprise any type of computing device capable of receiving input via a user interface, and may communicate the received input to one or more other computing devices. The architecture mapping platform 105, the computing device(s) 110, the external computing device(s) 180, and/or the other systems/devices in the computing environment 100 may, in some instances, comprise server computers, desktop computers, laptop computers, tablet computers, smart phones, wearable devices, or the like that in turn comprise one or more processors, memories, communication interfaces, storage devices, and/or other components. Any and/or all of the architecture mapping platform 105, the computing device(s) 110, the storage device(s) 120, and/or other systems/devices in the computing environment 100 may be, in some instances, special-purpose computing devices configured to perform specific functions.

Referring to FIG. 1B, the architecture mapping platform 105 may comprise one or more of host processor(s) 106, memory 107, medium access control (MAC) processor(s) 108, physical layer (PHY) processor(s) 109, transmit/receive (TX/RX) module(s) 109-1, or the like. One or more data buses may interconnect host processor(s) 106, memory 107, MAC processor(s) 108, PHY processor(s) 109, and/or Tx/Rx module(s) 109-1. The architecture mapping platform 105 may be implemented using one or more integrated circuits (ICs), software, or a combination thereof, configured to operate as discussed below. The host processor(s) 106, the MAC processor(s) 108, and the PHY processor(s) 109 may be implemented, at least partially, on a single IC or multiple ICs. Memory 107 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 108 and/or the PHY processor(s) 109 of the architecture mapping platform 105 are configured to generate data units, and process received data units, that conform to any suitable wired and/or wireless communication protocol. For example, the MAC processor(s) 108 may be configured to implement MAC layer functions, and the PHY processor(s) 109 may be configured to implement PHY layer functions corresponding to the communication protocol. The MAC processor(s) 108 may, for example, generate MAC data units (e.g., MAC protocol data units (MPDUs)), and forward the MAC data units to the PHY processor(s) 109. The PHY processor(s) 109 may, for example, generate PHY data units (e.g., PHY protocol data units (PPDUs)) based on the MAC layer data units. The generated PHY data units may be transmitted via the TX/RX module(s) 109-1 over the private network 150 and/or the public network 170. Similarly, the PHY processor(s) 109 may receive PHY data units from the TX/RX module(s) 109-1, extract MAC layer data units encapsulated within the PHY data units, and forward the extracted MAC data units to the MAC processor(s). The MAC processor(s) 108 may then process the MAC data units as forwarded by the PHY processor(s) 109.

One or more processors (e.g., the host processor(s) 106, the MAC processor(s) 108, the PHY processor(s) 109, and/or the like) of the architecture mapping platform 105 may be configured to execute machine readable instructions stored in memory 107. Memory 107 may comprise (i) one or more program modules/engines having instructions that when executed by the one or more processors cause the architecture mapping platform 105 to perform one or more functions described herein, and/or (ii) one or more databases that may store and/or otherwise maintain information which may be used by the one or more program modules/engines and/or the one or more processors. The one or more program modules/engines and/or databases may be stored by and/or maintained in different memory units of the architecture mapping platform 105 and/or by different computing devices that may form and/or otherwise make up the architecture mapping platform 105. For example, memory 107 may have, store, and/or comprise an architecture mapping engine 107-1, and an architecture mapping database 107-2. The architecture mapping engine 107-1 may comprise instructions that direct and/or cause the architecture mapping platform 105 to perform one or more operations, as discussed in greater detail below. The architecture mapping database 107-2 may comprise a SQL database, an Oracle database, or another relational database, for example. The architecture mapping database 107-2 may store information to be used for performing architecture mapping of an application. The architecture mapping database 107-2 may store information corresponding to the computing device(s) 110, the storage device(s) 120, the application(s) 130, the private networks 150 and 160, the public network 170, and/or the external computing device(s) 180 operating within the computing environment 100 for performing the architecture mapping of the application. The host processor(s) 106 may use the architecture mapping database 107-2 to store, identify, and/or retrieve the information to be used for performing architecture mapping. The architecture mapping database 107-2 may be updated based on performance of the architecture mapping, as discussed in greater detail below.

While FIG. 1A illustrates the architecture mapping platform 105 as being separate from other elements connected in the private network 150, in one or more other arrangements, the architecture mapping platform 105 may be included in one or more of the computing device(s) 110, and/or other device/servers associated with the private network 150. Elements in the architecture mapping platform 105 (e.g., host processor(s) 106, memory(s) 107, MAC processor(s) 108, PHY processor(s) 109, and TX/RX module(s) 109-1, one or more program modules and/or stored in memory(s) 107) may share hardware and/or software elements with and corresponding to, for example, one or more of the computing device(s) 110, and/or other device/servers associated with the private network 150.

Figure 2:
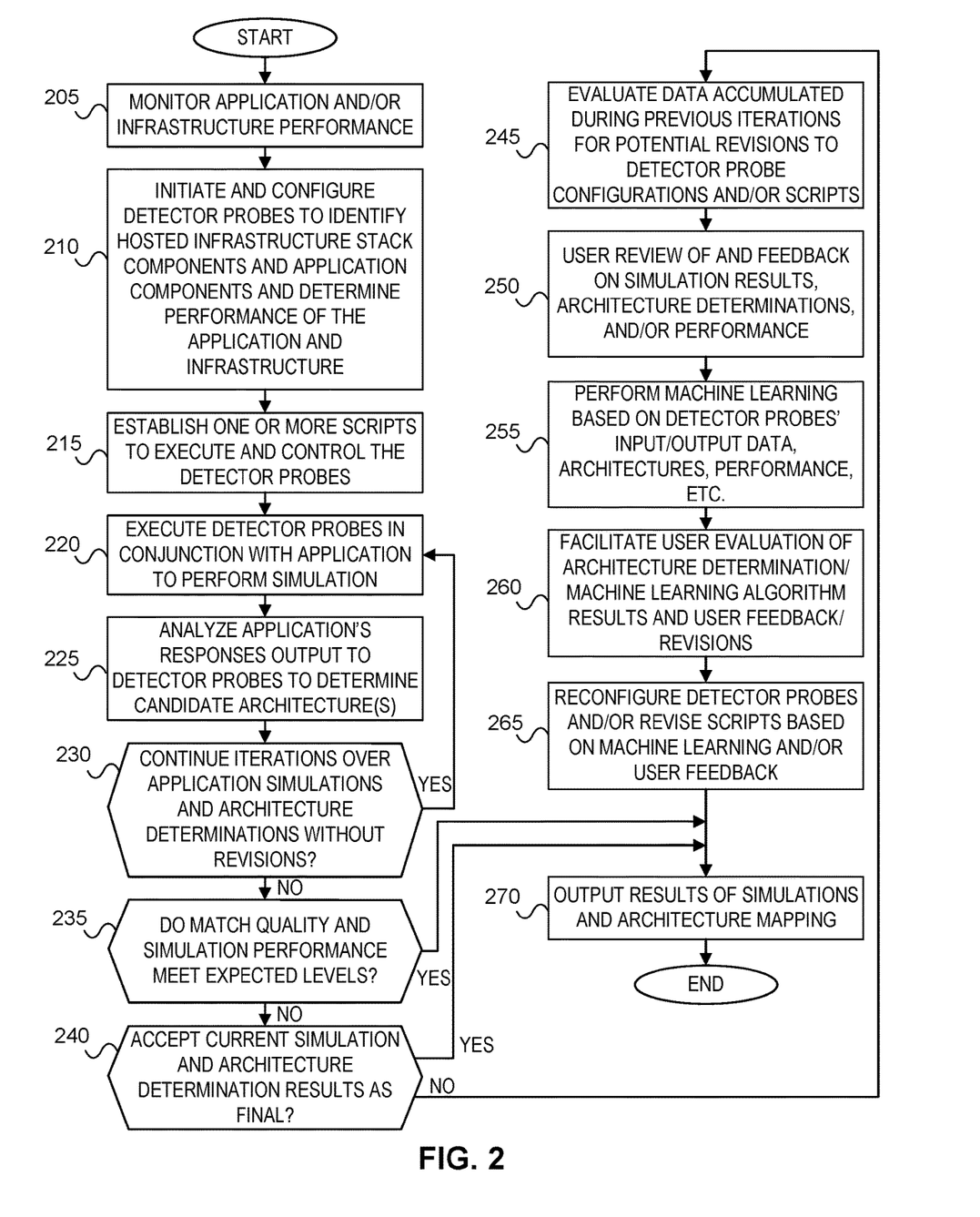
FIG. 2 depicts a conceptual diagram illustrating a computing system and process flow for architecture mapping of applications based on transaction traversing, in accordance with one or more example arrangements.

FIG. 2 depicts a process flow for architecture mapping of an application based on transaction traversing, in accordance with one or more example arrangements. The process flow shown in FIG. 2 is described with reference to the computing environment 100 merely as an example. In other arrangements, the architecture mapping of an application may be performed in a computing environment different from the computing environment 100. The architecture mapping of an application may be performed, for example, using the architecture mapping platform 105.

In operation 205, application and/or infrastructure performance may be monitored. A performance monitoring/analysis application may monitor, log, and/or display performance of the application and/or performance of the infrastructure hosting the application. The monitoring may be performed on an ongoing basis as the application executes while hosted by the infrastructure. The infrastructure hosting the application may comprise a computing system/network comprising a full stack, for example, an application hosted infra stack. The full stack may comprise an application code base, a database, a storage device, a computing server, a computing network, and computer system virtualization facilities.

In an operation 210, detector probes may be configured and initiated to identify the hosted infrastructure stack components and application components and determine the performance of the application and the infrastructure. The detector probes may be configured according to a computing environment in which the application executes and/or in which the detector probes are deployed. The detector probes may be configured to execute in a Java runtime environment, a mainframe computing system environment, or any combination of types of computing systems, operating systems, computing networks, or database systems, for example. The detector probes may be configured based on an interface protocol between the application code base and a computing infrastructure in which the application executes. The probes may be configured based on an interface protocol between the application code base and a user of the computing infrastructure in which the application executes. The probes may be configured to mimic the behavior of one or more users of the application in interacting with the application, according to a script, and evaluate output of the application to the probes in response to the mimicked behavior of the one or more users. The user may configure the probes via an extensible markup language (XML) file.

In an operation 215, one or more scripts may be established to execute and control the detector probes, for example, to mimic behavior of one or more different users of the application. The one or more scripts may be based on one or more preconfigured templates for performing application simulations and architecture mapping. The templates and/or scripts may be in the form of one or more text files, e.g., XML, files. The scripts may comprise programming language scripts, for example, Perl scripts. The one or more scripts may control the detector probes performing one or more different operations or transactions associated with the application, either sequentially, simultaneously, or a combination thereof. The one or more scripts may specify a temporal schedule of detector probes to be executed, a set of user data for configuring each of the detector probes to mimic a corresponding user, an application interface to be accessed by the detector probes, and/or a set of transaction input data for the detector probes to input into the specified application interface. The one or more scripts may comprise a set of executable instructions that access data from a database and launch detector probes to interact with an application interface, according to the data, and thereby mimic a user's operation and/or transaction using the application interface. Any number of detector probes may be launched at any given time according to the one or more scripts.

In an exemplary arrangement, the application may comprise an online banking platform for users to conduct banking transactions. One or more detector probes may be configured (e.g., in operation 210) to mimic one or more different users of the online banking platform, performing one or more different banking transactions, for example, checking a bank account balance, transferring funds from one account to another account, paying an online bill, etc. The one or more scripts may be established (e.g., in operation 215) to launch any number of detector probes based on different data at a given time to simulate a real-world situation in which any number of users may access and perform transactions using the application at a given time.

A detector probe may be configured, according to the one or more scripts, to perform a series of transactions via the application as a given user until completing the series of transactions and exiting from the application. A series of detector probes may be configured to perform a series of transactions via the application as a given user, with each detector probe of the series of detector probes configured to perform a single transaction via the application as the given user. The detector probes may be configured to log and/or store any responses that the detector probes may receive from the application in a database, for example, for later analysis. The one or more scripts may be established to control the logging and storing of the results by the detector probes.

In an operation 220, the detector probes may be executed in conjunction with the application to simulate the performance of the application in response to the detector probes' transactions via one or more corresponding interfaces of the application. The simulation may comprise executing the full stack corresponding to the application while the detector probes simulate or mimic user inputs provided to the application to perform operations and/or execute transactions via the application. Executing the simulation may comprise processing the scripts by a programming language interpreter, for example, a Perl interpreter.

The simulation may calibrate the application's simulation time duration based on a difference in how long processes take to execute during the simulation vs. during production execution of the application. An application that takes one (1) second to perform a particular operation in a typical real-world production computing environment may take, for example, a larger amount of time (e.g., 10 seconds) to perform the particular operation in the simulation environment. Time durations for performing simulations may also vary from time durations for executing the application in the real-world production environment, for example, due to differences in computing loads from other sources on the processor(s) executing the application in the real-world production environment compared with the simulation environment.

In an operation 225, the application's responses output to the detector probes may be analyzed to determine one or more candidate application architectures based on the responses. The one or more determined candidate architectures for the application may comprise, for example, the architecture of the application and the infrastructure hosting the application. A database mapping responses received from the application by the probes to application and/or infrastructure components may be consulted to determine the one or more candidate architectures. The one or more candidate architectures may be stored in the architecture mapping database 107-2, for example, as a doubly-linked list. One or more potential architectural components of the application may be simulated (e.g., in operation 220) for analysis (e.g., in operation 225) and comparison of the simulation results with execution results of the application given the same input.

In an exemplary arrangement, a detector probe may be configured to exercise a user login operation via an interface of an online banking application. The detector probe may input user data to the application, receive response data from the application, and input additional user data and/or one or more user selection(s) to the application based on the response data received from the application. The input user data may include a userid for a user to log into the application. The response data may include a request for a user password, a notice that the application is currently offline, or a notice that there is no user account associated with the input userid. The probe may be configured to input user data corresponding to a user password in response to the request for the user password. The probe may be configured to wait a specified period of time and restart exercising the user login operation again in response to the notice that the application is currently offline. The probe may be configured to end execution or restart exercising the user login operation again based on different user data in response to the notice that there is no user account associated with the input userid.

In the exemplary arrangement, the detector probe may receive response data from the application indicating a successful login to the application by the specified userid. The response data may include metadata and/or header information indicating one or more application components that were executed in processing the detector probe's request for login to the application using the given userid. The metadata and/or header information may indicate, for example, components of the application that were executed and/or an order or sequence in which the components were executed. The metadata and/or header information may indicate a user authentication module, accessing a userid database, accessing a single sign on system, and/or a user authorization module, for example. Analysis of the metadata and/or header information received by the detector probe may indicate one or more application modules exercised by the detector probe, a sequence in which the application modules are executed, computing systems and/or network communications/links associated with the one or more application modules exercised, and/or data that is passed between the one or more application modules.

The analysis of the application's responses output to the detector probes (e.g., in operation 225) may comprise analyzing metadata and/or headers of the responses. The metadata and/or headers of the responses may be generated by one or more modules of the application and/or infrastructure hosting the application, for example, based in input provided by the detector probes to the application. The detector probes may provide input to the application in conjunction with their corresponding operations and/or transactions. The detector probes' operations, transactions, and/or inputs to the application may correspond to a candidate architecture for the application and/or infrastructure. The analysis may comprise comparing the metadata and/or headers of responses with data stored in a database and correlated with particular architectural components and/or configurations. The analysis may comprise determining one or more candidate architectures and/or architecture components based on results of the comparisons. The analysis may comprise determining one or more deviations from or variations on the candidate architectures and/or architecture components associated with the detector probe's operations, transactions, and/or inputs to the application to which the analyzed metadata and/or headers are in response.

The one or more candidate architectures or architecture components of the application may comprise application components (e.g., logic, interfaces, functions, etc.), infrastructure components (e.g., computing, edge, transformation, connectivity, network, and/or services), data-oriented services (e.g., conversation endpoints such as third-party application programming interfaces (APIs), external data sources, enterprise APIs/services, enterprise data, management (e.g., business process server, governance, etc.), security, and/or interconnections. Applicant logic may provide output to conversations, discovery services, cognitive APIs, etc. The application architecture may indicate operation of application modules on a distributed computing system, for example, comprising one or more computing devices 110 of a private network 150 and/or private network 160, and/or one or more external computing devices 180 of a public network 170.

The analysis may comprise determining that one or more sets of metadata and/or headers received from the application by the detector probe in response to the detector probe's operations, transactions, and/or inputs to the application differ from expected responses by more than a threshold amount, and discarding an associated candidate architecture based on the determination. A discarded candidate architecture may be no longer considered in further iterations of performing simulations and architecture determinations and/or rendering. The threshold amount may be defined by a script that launches the detector probes, for example, based on data stored in a database and/or based on the associated candidate architecture. The candidate architecture may be discarded if metadata and/or headers received by the detector probe from the application (e.g., in response to the detector probe's operations, transactions, and/or inputs to the application) are determined to be inconsistent, erratic, and/or irreconcilably different from expected metadata and/or headers based on the detector probe's scheduled operations, transactions, and/or inputs to the application corresponding to the candidate architecture.

The analysis may comprise evaluating the performance of the application during the simulations, for example, in determining whether the candidate architecture is or is not acceptable. The analysis may include evaluation of a duration of time that passes before the application provides a result to the detector probe in response to the detector probe's input, for example, based on the detector probe's data, the infrastructure conditions, the associated candidate architecture, the metadata and/or header information, and/or a quantity of detector probes operating and/or transacting with the application at a given time. The analysis may comprise evaluating a quality or confidence level of a match of the candidate architecture based on the above-referenced factors and/or a portion or percentage of match between application performance and/or results received by the detector probes and ideals specified along with the detector probe data and/or defined by the script that launches the detector probe.

The analysis may comprise evaluating output received by the detector probes while the detector probes continue to perform operations, transactions, and/or input of data to the application in accordance with their associated scripts. Evaluation of the output may continue until the detector probes complete execution of the scripts and/or a single, final candidate architecture is determined. One or more candidate architectures and/or portions thereof may be determined in increments. One or more candidate architectures and/or portions thereof may be determined to be incorrect and/or discarded, for example, iteratively, in conjunction with simulation of the one or more candidate architectures including the application, infrastructure, and configurable detector probes. The determination and/or discarding of one or more candidate architectures and/or portions thereof may be based on associated input data and scripts, for example, during a subsequent iteration of simulation (e.g., operation 220) and/or analysis (e.g., operation 225).

In an exemplary arrangement, a candidate architecture for the application may include a single sign on (SSO) module or service (e.g., Software as a Service (Saas) module) that is called by the application to process userid and password data input by the detector probe. A detector probe for use in conjunction with simulation (e.g., operation 220) and evaluation (e.g., operation 225) of the candidate architecture may be configured (e.g., operations 210 and/or 215) with the userid and password data and threshold data for determining whether the candidate architecture should be discarded as incorrect, accepted as correct, or maintained as a candidate for further simulation and evaluation based on a response from the application. The threshold data may specify that the candidate should be discarded based on the userid and password being known in advance to be valid and eligible for processing by the SSO, yet the metadata and header information of the application's response do not indicate any traversal of the SSO module by the application's processing of the userid and password data. The threshold data may specify that the candidate should be accepted based on the userid and password being known in advance to be valid and eligible for processing by the SSO, and the metadata and header information of the application's response indicate traversal of the SSO module by the application's processing of the userid and password data. The threshold data may specify that the candidate should be maintained for further simulation and analysis based on the userid and password being not known in advance to be valid and eligible for processing by the SSO and the metadata and header information of the application's response not indicating any traversal of the SSO module by the application's processing of the userid and password data. The threshold data may specify that the candidate should be maintained for further simulation and analysis based on the userid and password being known in advance to be ineligible for processing by the SSO and the metadata and header information of the application's response not indicating any traversal of the SSO module by the application's processing of the userid and password data.

The analysis of operation 225 may fail to determine an architecture that corresponds to one or more results received from the simulated application by a detector probe in response to an input to the simulated application provided by the detector probe. There may not be a corresponding data entry in the architecture mapping database 107-2, for example. A user may be requested to review the data analyzed by the output analyzer and provide input regarding a candidate architecture that may correspond to the analyzed data. The user may provide the input via an XML file.

In operation 230, a determination may be made regarding whether application simulations, application architecture component determinations, and/or application architecture determinations should continue in an iterative fashion without intervention, e.g., for revisions to the detector probe configurations and/or scripts. The determination of whether to continue iterations uninterrupted may be made based on evaluation of whether the detector probes have completed execution of the scripts, whether a single final candidate architecture is determined, whether a number of total iterations to be completed as specified in the one or more scripts have been completed, whether a number of uninterrupted iterations to be completed since the prior detector probe configuration or script revision as specified in the one or more scripts have been completed, and/or whether another condition identified as indicating that iterating over the simulations and architecture determinations should continue end has been met. If the determination is made that simulation and architecture determination iterations should continue in an iterative fashion, the method may continue at operation 220 using the existing detector probes and scripts in conjunction with the data accumulated during previous iterations regarding application input/output and candidate architectures. Otherwise, the method may continue to operation 235.

In an operation 235, a determination may be made regarding whether the match quality and performance of a simulated candidate architecture sufficiently meet the expected or intended levels, and/or regarding whether a specified threshold or maximum number of iterations have been performed. If the determination is in the affirmative, the method may proceed to operation 270 to output and/or render the final and best mapped architecture of the application. If the determination is that there isn't a sufficient match quality for the simulation performance and/or determined architecture, and/or a specified threshold or maximum number of iterations have not yet been performed, the method may advance to operation 240 to facilitate revisions of the conditions of the simulations and architecture mapping determinations, potentially including user review and revisions, and then continue iterations of the application simulations and architecture mapping determinations.

In operation 240, a user may be invited to review the current simulation and architecture results and determine whether to accept them as the final results, or revise configurations for detector probes, edit/revise scripts used to control execution of the detector probes in conjunction with the application during the simulations, and/or edit/revise mapping of input/output results to candidate architecture components and/or architectures for use in determining architecture components and/or architectures in the current and/or future iterations. If the user determines to accept the current results as the final results, the method may proceed to operation 270. Otherwise, the method may proceed to operation 245.

In operation 245, the data accumulated during previous iterations regarding application input/output and candidate architectures as well as associated application performance and the quality of candidate match may be evaluated for potential revisions to detector probe configurations and/or scripts that control the detector probes during the application simulation iterations. The one or more candidate architectures and associated performance analysis and architecture determination results may be evaluated based on a level of the determined quality of match, amount of changes in the one or more candidate architectures over the most recent iteration, and/or performance of the application compared to expected performance over the most recent iteration compared to one or more threshold levels. The one or more candidate architectures and associated results may be flagged for user review and intervention based on a level of completeness of the one or more determined architectures and/or based on the one or more scripts completing launching detector probes for simulating operations of the application.

In operation 250, a user may be presented with the simulation results, architecture determinations, and associated analyses for review and feedback. The simulation results, architecture determination, and/or subsequent analysis thereof output data may be output for user evaluation via a mobile device and/or a computing device associated with a user. Manual intervention in the application simulation and architecture mapping iterative process may be facilitated, for example, by facilitating manual modification of the analysis results regarding the performance and the quality of match in the current iteration. The user's evaluation of the output data presented to the user may be analyzed. The user's response to the data presented to the user may indicate a level of accuracy and/or quality of the determinations regarding revisions to the candidate architecture(s) based on the output data from the simulations. The user's response to the presented data may indicate one or more revisions to the one or more candidate architecture(s) that should be made based on the output data from the simulations. Analysis of the user's response to the output data may indicate one or more revisions the mapping between detector probe input/output data sets and candidate architecture components. The user may reject a candidate architecture and/or an architecture or architecture component determination, for example. The rejected candidate architecture or architecture/component determination may be no longer considered in simulations or mapped to simulation results in further iterations of performing simulations and architecture determinations. Previously rejected candidate architecture or architecture/component determinations may be reconsidered by the user and optionally reinstated. Previously rejected candidate architecture or architecture/component determinations may be reconsidered, for example, in a future iteration if other options are determined to have a lower probability of correctness or upon user direction.

In an operation 255, a machine learning algorithm may analyze the one or more detector probes' input/output data, one or more candidate architectures, and associated performance analysis and architecture determination results. The machine learning may be performed based on one or more simulated candidate architectures for the application, data input into the simulated candidate architectures by one or more detector probes, results received by the one or more detector probes from the simulated application, changes in the determined candidate architectures based on the received results, and/or user feedback upon review of the results in operation 250. The machine learning algorithm may, for example, incorporate user feedback regarding the one or more candidate architectures, application input/output data, mapping to architecture components and architectures, performance of the application, and quality of match. Results from the machine learning may be used to update the architecture mapping database 107-2 for improved accuracy in determining architecture components and architectures for the application, for example, based on one or more responses received from the application by the detector probes. The architecture mapping database 107-2 may be updated for any or each completed iteration of application simulation and architecture determination, completed cycle of inputting data into the simulated application by a detector probe and receiving response data from the simulated application, and/or determination of application performance and quality of match based on the results of the simulation iteration. The completed cycle for the detector probe may comprise one or more sequences of data input into the application interface and response data received from the application interface.

In operation 260, user evaluation of the architecture determination and/or machine learning algorithm results may be facilitated. The machine learning algorithm may output data regarding results of the most recent iteration(s) since the prior execution of the machine learning algorithm on the simulation and architecture determination results, for example, detector probes' data input into one or more simulated candidate architectures of the application along with corresponding response data received by the detector probes from the simulated candidate architectures in conjunction with one or more determinations regarding the candidate architecture. The simulation results, architecture determination, analysis, and/or machine learning algorithm output data may be output for user evaluation via a mobile device and/or a computing device associated with a user. The user's evaluation of the output data presented to the user may be analyzed. The user's response to the data presented to the user may indicate a level of accuracy and/or quality of the determinations regarding revisions to the candidate architecture(s) based on the output data from the simulations. The user's response to the presented data may indicate one or more revisions to the one or more candidate architecture(s) that should be made based on the output data from the simulations. The response analyzer may determine that a user's response to the output data indicates one or more revisions to one or more probe's data input into the simulated one or more candidate architecture(s) that should be made based on the output data. The user may reject a candidate architecture and/or an architecture or architecture component determination, for example. The rejected candidate architecture or architecture/component determination may be no longer considered in simulations or mapped to simulation results in further iterations of performing simulations and architecture determinations. Previously rejected candidate architecture or architecture/component determinations may be reconsidered, for example, in a future iteration if other options are determined to have a lower probability of correctness or upon user direction.

In operation 265, the configurable detector probes may be reconfigured and/or the scripts may be revised based on the machine learning of operation 255 and/or the user feedback and revisions of operation 260. Through these reconfigurations and/or revisions, the one or more configurable detector probes and/or one or more scripts for performing the simulations and architecture determinations may be dynamically generated, revised, and/or executed for further iterations of the architecture mapping. The reconfigurations and/or revisions may be based on analysis of results from the prior iteration of simulation and analysis for architecture mapping, user feedback regarding the results of the prior iteration, and/or associated machine learning. One or more scripts for additional iterations may be generated based on one or more predefined templates and/or input data provided by the user.

In an exemplary arrangement, the analysis of operation 225 may determine that a set of results data received by a detector probe from the simulated application in response to a set of input data provided to the application by the detector probe corresponds to a load balancer component as part of the application architecture. When the user views the data and architecture component determination in operation 260, the user may determine that the correct architectural component should have been a cluster, not a load balancer. The user may input data to correct the architecture component mapping, the machine learning algorithm may incorporate the user's input, and the architecture mapping database 107-2 may be updated based on the user's feedback and the machine learning algorithm's use of the user's feedback and results of the simulations. Via the user's feedback, the machine learning, and updating of the architecture mapping database 107-2, better determinations regarding recognizing cluster architectural components may be made in future iterations and/or future application architecture mapping operations.

In operation 270, results of the simulations and architecture mapping may be output. Outputting the results may include rendering the finally determined architecture. The output the results may include outputting an error message if the maximum number of iterations have been performed, yet the match quality and performance of a simulated candidate architecture does not sufficiently match the expected or intended levels, as may be determined at operation 235. Sufficient levels of quality and performance may be determined according to threshold values of measurements and/or characteristics, for example: how quickly the application provides a response to the detector probe after receiving the data input by the detector probe; how quickly a candidate architecture is determined based on the one or more detector probes providing input to the application; how many simultaneous users (e.g., detector probes mimicking users) the application can process with a sufficient level of performance and without crashing, interrupting, etc. In an exemplary arrangement, if an application in the original operating environment is able to handle 5,000 simultaneous users well, candidate architectures may be simulated with 5,000 simultaneous users for comparison of performance under the same processing load. How well the application performs with a high number of users may be based on the application's architecture implementation.

Figure 3:
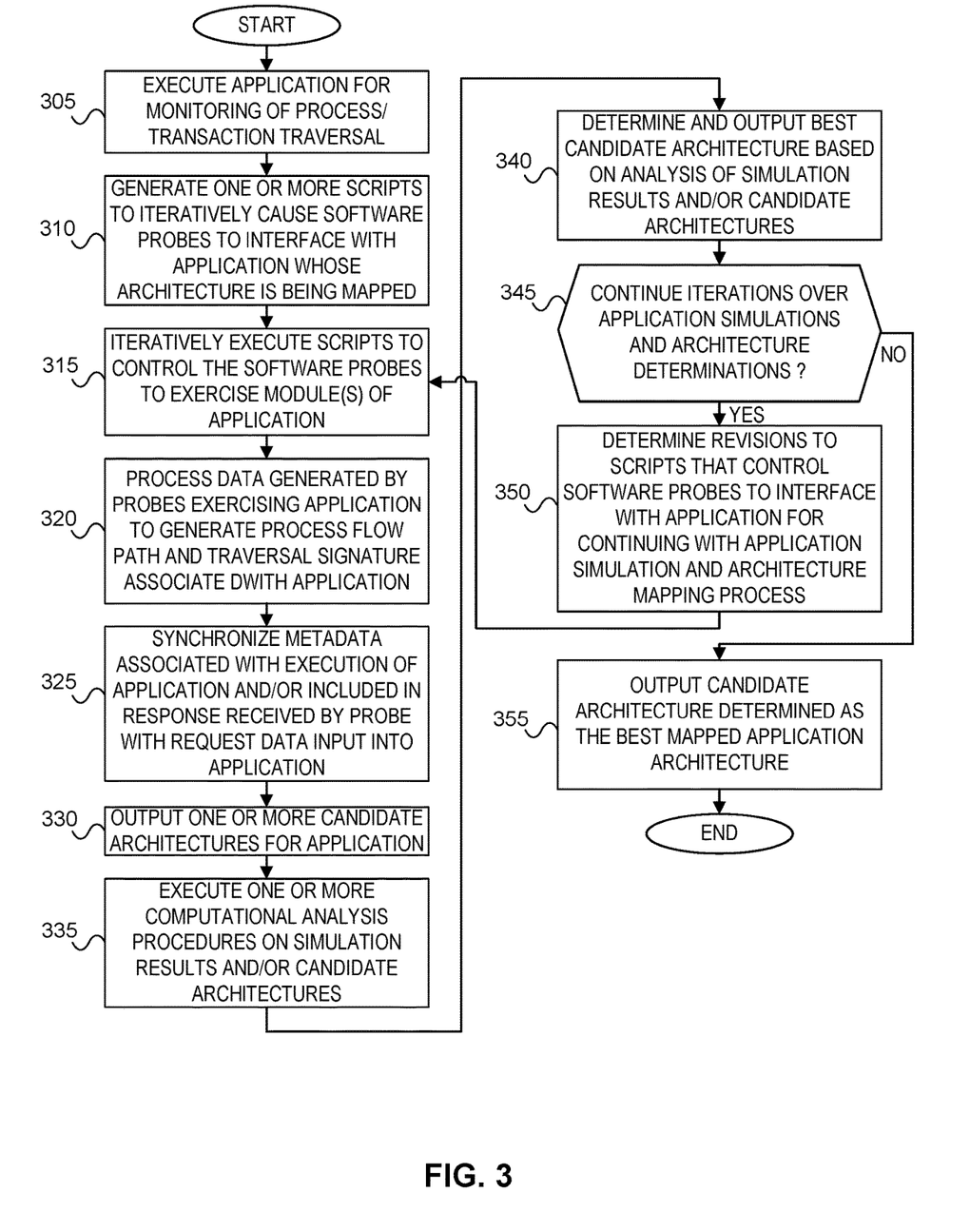
FIG. 3 depicts a conceptual diagram illustrating a process flow for architecture mapping of applications based on transaction traversing, in accordance with one or more example arrangements.

FIG. 3 depicts a process flow for architecture mapping of an existing application based on transaction traversing, in accordance with one or more example arrangements. The process flow shown in FIG. 3 is described with reference to the computing environment 100 merely as an example. In other arrangements, the architecture mapping of an application may be performed in a computing environment different from the computing environment 100. The architecture mapping of an application may be performed, for example, using the architecture mapping platform 105.

At operation 305, an application whose architecture is being mapped may be executed in conjunction with process for monitoring of requests input to the application, transactions being processed by the application, and/or associated processes traversing through the application and associated software and/or infrastructure components. The application may be invoked at one or more different privilege levels and/or using one or more different access types, for example, based on the privilege levels and/or access types associated with practical use of the application in a production computing environment. The privilege levels and/or one or more different access types may be based on one or more identified users of the application in practice. Privilege levels and/or access types of one or more software probes may also be set for interfacing with the application. The software probes may be interfaced with the application to facilitate tracing execution of the application and traversal of processes and/or transactions performed by the application. The software probes may be launched with different privilege levels and/or access types based on the privilege levels and/or access types associated with corresponding users of the application in a production computing environment. Attributes corresponding to the privilege levels and/or access types may be stored in a database (e.g., the architecture mapping database 107-2), embedded in the one or more software probes, and/or embedded in requests submitted to the application for processing. The software probes may track privilege access levels within the application as part of the probe's monitoring of the request's traversal of the application's and/or associated infrastructure components.

At operation 310, one or more scripts may be generated to iteratively cause software probes to interface with the application whose architecture is being mapped, for example, by submitting one or more requests and/or receiving one or more responses from the application. The scripts may be generated based on predetermined patterns, templates, and/or any current knowledge of the architecture and/or functionality of the application whose architecture is being mapped. Any number of probes may be caused to interface with the application simultaneously, for example, hundreds or thousands of probes. A script may be responsible for controlling one or more probes simultaneously and/or sequentially. Patterns of input data sequences and/or corresponding expected responses for comparison with responses received from the application may be associated with the scripts.

At operation 315, the scripts may be iteratively executed to control the software probes to exercise one or more modules of the application whose architecture is being mapped. During execution of the application, based on the scripts, the probes may output data that, upon analysis, facilitate detection of components of the infrastructure stack and of the application whose architecture is being mapped. The data output by the probes may also facilitate detection of traversal paths of requests submitted to the application, determination of a level of the application's responsiveness to the requests, and one or more responses generated by the application in response to input data. The data determined by the probes through the iterations of the application may be tagged with identifiers to correlate the data with the associated iteration instance.

At operation 320, the data generated by the probes exercising the application at operation 315 may be processed to detect components of the application and/or infrastructure stack associated with the request's processing by and/or traversal through the application. Analysis of the data may facilitate generation of a process flow path and a traversal signature associated with the application. Attributes specific to the data input into the application and/or one or more users mimicked by the probes as executing the application may be analyzed and/or included in the generation of the process flow path and traversal signature. Responsiveness of the application to the requests processed by the application may also be evaluated. Metadata and/or header information associated with a request input into the application by a probe may be modified by application components and/or infrastructure components (e.g., a web server, an application server, a database server, etc.), so that analyzing the metadata and/or header information of the response received from the application by the probe may indicate and facilitate reconstruction of an associated request's traversed path through the application and infrastructure components to arrive at the response. The metadata and/or header information of the response received from the application by the probe may include one or more timestamps and/or processing times associated with the one or more components traversed by the request, the time that the request was sent to the application, and/or the time that the application output the final response. The timestamps and/or processing times may be included in the analysis to determine the components traversed, the quality of the mapped architecture, and/or the performance of the application under the simulated conditions (e.g., user request load, application server load, web server load, database server load, and/or network load, etc.).

At operation 325, metadata associated with the execution of the application and/or included in a response received by a probe from the application may be synchronized, for example, with request data input into the application as part of a request by the probe and/or with request data metadata associated with other one or more probes that interface with the application. The metadata synchronization may be with a unified temporal history associated with the application incorporating data from multiple probes. Metadata from one iteration of application simulation and architecture rendering may be synchronized with metadata from one or more prior iterations, as changes in the candidate architectures from one iteration to the next may be stored with reference to one or more prior stored candidate architectures. An entire application architecture may not be rendered anew during each iterations, but rather, changes and/or refinements to the application architecture determined through one or more prior iterations may be rendered and stored at a current iteration. A framework testing engine, simulator, and/or renderer may perform one or more simulations based on one or more representations of the application. One or more potential candidate architectures for the application may be rendered based on results of the simulations.

At operation 330, one or more candidate architectures and/or associated simulation results may be output. The one or more candidate architectures and/or associated simulation results may be output for computational analysis and/or review by a user.

At operation 335, one or more computational analysis procedures may be executed to determine how well the one or more candidate architectures and simulation results match the anticipated or target performance. The computational analysis procedures may include machine learning methods based on a database of architectures and architectural elements that correspond to data input/output pairs of application simulations. A score may be generated to reflect the quality of a match for a determined application architecture. A score may be generated to reflect a processing efficiency of the application determined during the simulation.

At operation 340, a best candidate architecture may be determined based on the analysis of operation 335. The best candidate architecture may be output to a metrics evaluation process and/or to a user for review.

At operation 345, a user and/or a metrics evaluation process may determine, based on a review and/or analysis of the simulation results and mapped candidate architecture(s) whether the architecture mapping process should iteratively continue, for example, via operations 315 onward. If the architecture mapping process is determined to iteratively continue, the method may proceed to operation 350. Otherwise, the method may proceed to operation 355.

At operation 350, a user and/or machine learning method may determine revisions to the scripts that control the software probes to interface with the application for continuing with the application simulation and architecture mapping process. The revisions may be made to improve the incremental matches of candidate architectures and architecture components based on the detected process/transaction traversing of the application. Upon completion of the revisions to the scripts, the method may return to operation 315.

At operation 355, the currently determined candidate architecture of operation 340 may be output as the best result to complete the architecture mapping process. The architecture may be output to a display for a user to view. The architecture may be output to a database. The architecture may be output for use in a future application architecture simulation and architecture mapping operation. The architecture that is output may be output for use in migrating the application from the current platform and/or environment on which the application executes to a new platform and/or environment while maintaining the same or similar architecture, functionality, responsiveness, and operability as the application on the current platform and/or environment.

In an exemplary arrangement, a system and method for architecture mapping of applications based on transaction traversing includes a database, for example, a relational database, that defines relationships between header and metadata information (e.g., as applied by an application to data structures corresponding to a request input into the application) and architectural components of an application and/or infrastructure. The application software may be exercised by software probes that input requests into the application and receive responses back from the application, measure the responsiveness and processing time taken by the application to provide the responses, and record the responses including associated header and metadata information. The header and metadata information of the response received by a software probe from the application may be used as a key to query the database and determine one or more architecture components associated with the header and metadata information. A sequence of the information stored in the header and metadata received by the software probe may be evaluated to determine a sequential order in which the determined architecture components processed the request input into the application by the software probe, and/or a path traversed by the request through the determined application's architectural components. Exercising the known request processing functions of the application in the above manner may facilitate building up of a hierarchical graph or directional graph representing the application's architecture, including the architectural components represented as vertices and paths traversed among the architectural components in processing requests represented as lines or arrows between the vertices.

In an exemplary arrangement, a system and method for architecture mapping of applications based on transaction traversing may evaluate output data provided by the application in a test environment in response to requests input into the application by a software probe, compared to output data provided by the application in response to user requests made in the application's standard operating environment, to determine candidate architectural components and arrangements. The system and method may also compare responsiveness and processing time of the application under test in response to a request with measured responsiveness and processing time of the application in the application's standard operating environment. The system and method may evaluate a list or database of potential candidate architectural components and architectures. Candidates that are determined to not match may be discarded and other candidates may be considered as an overall architecture is iteratively compiled together. A machine learning process may make advancements toward determining a final complete software architecture based on the iterative process and evaluating request inputs, request outputs, header and metadata information, responsiveness of the application, processing time, and a relational database that associates architectural components with one or more of these characteristics. The machine learning process may build upon the database of architectural components and candidate architectures associated with application request input/output data and performance data to improve accuracy and efficiency of future application architecture mappings. A manual adjustment of the data used in the iterative process and/or the results generated at any stage of the iterative process may be facilitated. The manual adjustment may be triggered, for example, if the machine learning and/or iterative process fails to arrive at architectural component and/or candidate architecture results that meet conditions to be considered a correct match, or the database fails to provide architectural component and/or candidate architecture data associated with the application simulation data input to the database, for example. The manual adjustment may be facilitated by providing request and response metadata and header information determined through simulation of the application that may not be visible to a user of the application in the application's standard operating environment.

Example arrangements as discussed herein provide features and benefits for migrating applications and/or changing computing platforms and/or environments on which applications may be hosted. Due to changes in application and/or infrastructure architectures made over time, for example, over decades of application deployment and maintenance, a current architecture of an application and/or infrastructure on which the application is deployed may not be known. This lack of information may be due to attempts to save time and resources by making rapid changes without thorough documentation, by changes in management and/or staff responsible for development and maintenance of the application and/or infrastructure over time, by changes in corporate ownership and/or oversight of the application and/or infrastructure over time, changes in technologies and providers of hardware/software components associated with the application and/or infrastructure over time, etc. Architecture mapping processes may facilitate detecting internal application and/or infrastructure architectures although no current documentation of the application and/or infrastructure architecture may exist. Lost time, effort, and errors that may be associated with attempts to reverse engineer an application to determine the architecture without sufficient documentation may be avoided. By determining the architecture of the existing application and/or infrastructure on which the application is deployed, starting from scratch to develop a new application and/or infrastructure in a new computing platform as may be required if the current application cannot be migrated to the new computing platform may be avoided. With the determined current application architecture information, the application may be redeployed in a new computing platform based on the current known architecture, and the redeployed application may be validated against the originally deployed application to ensure correct operation. The application architecture mapping may therefore save on labor and a duration of time required for migrating or redeploying the application, as well as increase efficiency, reliability, and repeatability of performance of a migrated or redeployed application compared to the original application. The migrated or redeployed application on a different computing platform may provide a more uniform and familiar functionality and interoperability with other systems when compared to the original application when based on the same architecture than when created anew from scratch, as may be required if the architecture of the original application is unknown.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various examples. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware example, an entirely software example, an entirely firmware example, or an example combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative examples thereof. Numerous other examples, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   execute an executable application;
   input a series of request data sets into the executable application;
   extract one or more indications of an architectural component from metadata associated with one or more responses received from the executable application and associated with a corresponding request data set of the series of request data sets, the one or more indications of an architectural component associated with processing by the executable application of the corresponding request data set of the series of request data sets; and
   determine, based on the one or more indications of an architectural component and corresponding request data sets, an architecture of the executable application.

2. The computing platform of claim 1, wherein the memory further stores computer-readable instructions that, when executed by the at least one processor, cause the computing platform to:
   retrieve the one or more indications of an architectural component from a database based on a database search on a key comprised by the metadata associated with one or more responses received from the executable application and associated with a corresponding request data set of the series of request data sets.

3. The computing platform of claim 1, wherein the memory further stores computer-readable instructions that, when executed by the at least one processor, cause the computing platform to:
   determine, based on an order of appearance of the one or more indications of an architectural component extracted from the metadata, a sequence in which a plurality of architectural components process a request data set of the series of request data sets; and
   render a directed graph representing a traversal of architectural components, corresponding to the one or more indications, by the processed request data set.

4. The computing platform of claim 1, wherein the memory further stores computer-readable instructions that, when executed by the at least one processor, cause the computing platform to:
   determine a responsiveness of the executable application to the series of request data sets input into the executable application; and
   determine, based on the determined responsiveness of the executable application to a request data set of the series of request data sets input into the executable application, whether an associated architectural component is correctly determined.

5. The computing platform of claim 1, wherein the memory further stores computer-readable instructions that, when executed by the at least one processor, cause the computing platform to:
   establish a script to control inputting of the series of request data sets into the executable application in an iterative process; and
   revise the script, based on an evaluation of the extracted one or more indications of an architectural component in one iteration of the iterative process, to control inputting of the series of request data sets into the executable application in a subsequent iteration of the iterative process.

6. The computing platform of claim 1, wherein the memory further stores computer-readable instructions that, when executed by the at least one processor, cause the computing platform to:
   perform machine learning based on the series of request data sets input into the executable application, based on the one or more responses received from the executable application, and based on the extracted one or more indications of an architectural component; and
   update, based on the machine learning, a database that associates the one or more indications of an architectural component with the metadata associated with the one or more responses received from the executable application and associated with series of request data sets input into the executable application.

7. A computing system, comprising:
   a first computing platform comprising:
      at least one first processor;
      a first communication interface communicatively coupled to the at least one first processor; and
      a first memory communicatively coupled with the at least one first processor; and
   a second computing platform comprising:
      at least one second processor;
      a second communication interface communicatively coupled to the at least one second processor; and
      a second memory communicatively coupled with the at least one second processor;
   wherein the first memory stores computer-readable instructions that, when executed by the at least one first processor, cause the first computing platform to:
      input a series of request data sets into an executable application hosted by the second computing platform;
      extract one or more indications of an architectural component from metadata, associated with one or more responses received from the executable application, and associated with a corresponding request data set of the series of request data sets, the one or more indications of an architectural component associated with processing by the executable application of the corresponding request data set of the series of request data sets; and
      determine, based on the one or more indications of an architectural component, an architecture of the executable application; and wherein the second memory stores computer-readable instructions that, when executed by the at least one second processor, cause the first computing platform to:
execute the executable application.

8. The computing system of claim 7, wherein the first memory further stores computer-readable instructions that, when executed by the at least one first processor, cause the first computing platform to:
retrieve the one or more indications of an architectural component from a database based on a database search on a key comprised by the metadata associated with one or more responses received from the executable application and associated with a corresponding request data set of the series of request data sets.

9. The computing system of claim 7, wherein the first memory further stores computer-readable instructions that, when executed by the at least one first processor, cause the first computing platform to:
determine, based on an order of appearance of the one or more indications of an architectural component extracted from the metadata, a sequence in which a plurality of architectural components process a request data set of the series of request data sets; and
render a directed graph representing a traversal of architectural components, corresponding to the one or more indications, by the processed request data set.

10. The computing system of claim 7, wherein the first memory further stores computer-readable instructions that, when executed by the at least one first processor, cause the first computing platform to:
determine a responsiveness of the executable application to the series of request data sets input into the executable application; and
determine, based on the determined responsiveness of the executable application to a request data set of the series of request data sets input into the executable application, whether an associated architectural component is correctly determined.

11. The computing system of claim 7, wherein the first memory further stores computer-readable instructions that, when executed by the at least one first processor, cause the first computing platform to:
establish a script to control inputting of the series of request data sets into the executable application in an iterative process; and
revise the script, based on an evaluation of the extracted one or more indications of an architectural component in one iteration of the iterative process, to control inputting of the series of request data sets into the executable application in a subsequent iteration of the iterative process.

12. The computing system of claim 7, wherein the first memory further stores computer-readable instructions that, when executed by the at least one first processor, cause the first computing platform to:
perform machine learning based on the series of request data sets input into the executable application, based on the one or more responses received from the executable application, and based on the extracted one or more indications of an architectural component; and
update, based on the machine learning, a database that associates the one or more indications of an architectural component with the metadata associated with the one or more responses received from the executable application and associated with series of request data sets input into the executable application.

13. A non-transitory computer-readable medium storing instructions that, when executed, cause performance of:
executing an executable application;
inputting a series of request data sets into the executable application;
extracting one or more indications of an architectural component from metadata associated with one or more responses received from the executable application and associated with a corresponding request data set of the series of request data sets, the one or more indications of an architectural component associated with processing by the executable application of the corresponding request data set of the series of request data sets; and
determining, based on the one or more indications of an architectural component and corresponding request data sets, an architecture of the executable application.

14. The non-transitory computer-readable medium of claim 13, further comprising instructions that, when executed, cause performance of:
retrieving the one or more indications of an architectural component from a database based on a database search on a key comprised by the metadata associated with one or more responses received from the executable application and associated with a corresponding request data set of the series of request data sets.

15. The non-transitory computer-readable medium of claim 13, further comprising instructions that, when executed, cause performance of:
determining, based on an order of appearance of the one or more indications of an architectural component extracted from the metadata, a sequence in which a plurality of architectural components process a request data set of the series of request data sets; and
rendering a directed graph representing a traversal of architectural components, corresponding to the one or more indications, by the processed request data set.

16. The non-transitory computer-readable medium of claim 13, further comprising instructions that, when executed, cause performance of:
determining a responsiveness of the executable application to the series of request data sets input into the executable application; and
determining, based on the determined responsiveness of the executable application to a request data set of the series of request data sets input into the executable application, whether an associated architectural component is correctly determined.

17. The non-transitory computer-readable medium of claim 13, further comprising instructions that, when executed, cause performance of:
establishing a script to control inputting of the series of request data sets into the executable application in an iterative process; and
revising the script, based on an evaluation of the extracted one or more indications of an architectural component in one iteration of the iterative process, to control inputting of the series of request data sets into the executable application in a subsequent iteration of the iterative process.

18. The non-transitory computer-readable medium of claim 13, further comprising instructions that, when executed, cause performance of:
performing machine learning based on the series of request data sets input into the executable application, based on the one or more responses received from the executable application, and based on the extracted one or more indications of an architectural component; and updating, based on the machine learning, a database that associates the one or more indications of an architectural component with the metadata associated with the one or more responses received from the executable application and associated with series of request data sets input into the executable application.

19. A method comprising:

executing an executable application;

executing a software probe that interfaces with an application interface of the executable application to:
  input a series of request data sets into the executable application, and
  receive one or more responses, from the executable application, corresponding to a respective one or more of the series of request data sets;

extracting one or more indications of an architectural component from metadata associated with the one or more responses received from the executable application, the one or more indications of an architectural component associated with processing by the executable application of the corresponding request data set of the series of request data sets; and determining, based on the one or more indications of an architectural component and corresponding request data sets, an architecture of the executable application.

20. The method of claim 19, further comprising instructions that, when executed, cause performance of:
  retrieving the one or more indications of an architectural component from a database based on a database search on a key comprised by the metadata associated with one or more responses received from the executable application and associated with a corresponding request data set of the series of request data sets.

21. The method of claim 19, further comprising instructions that, when executed, cause performance of:
  determining, based on an order of appearance of the one or more indications of an architectural component extracted from the metadata, a sequence in which a plurality of architectural components process a request data set of the series of request data sets; and
  rendering a directed graph representing a traversal of architectural components, corresponding to the one or more indications, by the processed request data set.

22. The method of claim 19, further comprising instructions that, when executed, cause performance of:
  determining a responsiveness of the executable application to the series of request data sets input into the executable application; and
  determining, based on the determined responsiveness of the executable application to a request data set of the series of request data sets input into the executable application, whether an associated architectural component is correctly determined.

23. The method of claim 19, further comprising instructions that, when executed, cause performance of:
  establishing a script to control inputting of the series of request data sets into the executable application in an iterative process; and
  revising the script, based on an evaluation of the extracted one or more indications of an architectural component in one iteration of the iterative process, to control inputting of the series of request data sets into the executable application in a subsequent iteration of the iterative process.

24. The method of claim 19, further comprising instructions that, when executed, cause performance of:
  performing machine learning based on the series of request data sets input into the executable application, based on the one or more responses received from the executable application, and based on the extracted one or more indications of an architectural component; and
  updating, based on the machine learning, a database that associates the one or more indications of an architectural component with the metadata associated with the one or more responses received from the executable application and associated with series of request data sets input into the executable application.

* * * * *